Patented Mar. 4, 1941

2,233,585

UNITED STATES PATENT OFFICE 2,233,585

GRINDING MATERIAL

Charles H. Commons, Jr., Niagara Falls, N. Y., assignor to The Titanium Alloy Manufacturing Company, New York, N. Y., a corporation of Maine No Drawing. Application October 11, 1940, Serial No. 360,791

16 Claims. (Cl. 51—308)

This invention relates to grinding. More particularly, it relates to a grinding composition suitable for manufacture into balls and the like for ball mills, and also for lining such ball mills. Additionally, it relates to balls and the like made therefrom.

In the grinding of ceramic materials of various kinds it is the general custom to use either selected natural flint or a porcelain for the mill lining and balls or rods. Flint is generally considered to be a crypto-crystalline form of naturally formed silica containing some water either tenaciously adsorbed to the minute particles or chemically combined. Porcelain, as generally understood in this connection, is composed of mixtures of finely ground silica, feldspar, and clay or clays, which may contain small percentages of auxiliary fluxes such as talc, limestone, etc., and is formed into the desired shape by usual methods and fired to a practically impermeable mass. Metals are seldom if ever used because of the coloring effect of the abraded metal on the ceramic material when finally processed. Both flint and porcelain have properties which recommend their use as well as disadvantages. Flint, for example, has better abrasion resistance than porcelain. Its work absorption is higher, or as commonly expressed it tougher. However, it is more brittle than porcelain when subjected to mechanical shocks or thermal shocks, although the latter is not generally encountered in normal practice. When particles of flint are broken off of the balls or lining and become mixed with the batch being ground, it is liable to cause trouble with some materials such as enamels or glazes, as the flint particles violently disintegrate when heated and cause a disruption of the coating or body at the point where the particle might lie in the layer when being heated to finish it. Porcelain is less easily broken by mechanical or thermal shocks than flint, can be made more accurately to the desired shape, etc., but is more easily abraded than flint, although its resistance towards abrasion varies somewhat according to the specific porcelain compositions used.

It is therefore an object of this invention to provide a material suitable for the lining of ball mills and for the balls or rods therein. Another object is to provide such a material which has the advantages of porcelain plus a resistance to abrasion closely approaching that of flint. A further object is to provide such a material which is fired as with ordinary porcelain without requiring excessively high firing temperatures. Other objects will appear hereinafter.

These objects are accomplished by means of a composition comprising zirconium silicate or zircon, clay, and preferably an auxiliary flux.

Natural zirconium silicate or zircon is preferably used as the source of the zirconium silicate in the present invention. The preferred amount of this material is about 60% of the mass. As the amount of zircon is increased much above this, the resistance to abrasion drops, as will be shown later. Furthermore, zircon is more expensive than the clay used as an ingredient of the composition, although less expensive than some of the auxiliary fluxes. Finally, as the amount of zircon rises, the firing temperature must be raised. Therefore, while as much as 70% zircon or even higher can be used, it is preferred to keep it below 65%. On the other hand, the amount of zircon can be reduced appreciably without affecting the abrasion resistance to nearly as great an extent. Thus, amounts as low as 35% or even lower can be used, although above 45% is preferred.

In addition to zircon, it is necessary to include in the composition a certain quantity of clay, particularly a ball clay. A clay such as Kentucky ball clay has been found to be very satisfactory, but other ball clays also work well. The clay serves to produce a plasticity of the mixture when wet, good strength when dry, and impermeability when fired, and permits a relatively low firing temperature to be used. Too high a clay content, however, although permitting a still lower firing temperature, decreases the resistance to abrasion of the fired body. About 18% of clay in the composition produces the best results, but quantities between 12 and 28%, or higher or lower, depending upon the quantity of zircon and auxiliary flux used, have also produced satisfactory results.

In order to still further lower the firing temperature at which proper vitrification is secured, an auxiliary flux is also preferably added to the composition. The ordinary fluxes used in ceramics, such as feldspar, talc, etc., may be used. Certain special fluxes have also been found suitable, among these being sodium zirconium silicate, calcium zirconium silicate, barium zirconium silicate, magnesium zirconium silicate, lead zirconium silicate, zinc zirconium silicate, zirconium spinel (the material described in U. S. Patent No. 2,083,024), titanium oxide, calcium titanate, borax, boric acid, and glass powders of various kinds from soft frits to "Pyrex" chemically resistant glass. By far the best flux, however, is a mixture of calcium zirconium silicate, barium zirconium silicate and magnesium zirconium silicate, this producing the best resistance to abrasion, high density of the balls, and good resistance to breakage (lack of brittleness) when subjected to mechanical shocks. Fired samples can be thrown onto concrete hard enough to bounce the balls 15 to 20 feet in the air without breaking them.

The preferred quantity of flux used is around

22%. For example, 7½% each of calcium, barium and magnesium zirconium silicates produces excellent results. Quantities between 17 and 35% are also satisfactory, and even quantities outside these limits may be used under certain conditions. Small additions of other fluxes as well as higher proportions of these fluxes may be used if a lower firing temperature is desired, but to fire at 2300° F. (firing temperature for commercially firing porecelain balls), no further additions are necessary. However, if additional fluxes are necessary to further lower the maturing temperature, titanium oxide and titanates of the alkaline earths are preferred to fluxes containing alkalies. Feldspar, sodium zirconium silicate and glasses are not nearly as advantageous in lowering the abrasion index as other materials, and should not be used to obtain the best results. Sodium zirconium silicate is the least harmful method of adding alkali and shows some merit where low firing temperatures are desired.

In the preparation of the composition of the present invention for firing, sufficient water is added to make it plastic, as is well known in the ceramic arts. The bodies are molded into shape, dried and fired, all in well known fashion.

In addition to the specific ingredients of the present composition, the particle sizes thereof are extremely important. It has been found that the finer the particle sizes the more resistant to abrasion is the resulting fire body. However, the rate of increase of abrasion resistance decreases as the particle sizes fall to about 5 microns, so that there is generally not enough to be gained, by reducing the particles much below this size, to justify the greatly increased difficulty of obtaining much finer particles. Many clays exist in nature in a sufficiently fine state of subdivision for this purpose, but the fluxes and the zircon must be ground to the required size.

The following example is now given of a preferred method of practicing the invention:

*Example (parts by weight)*

59.25 parts of zirconium silicate, 18.52 parts of Kentucky ball clay, 7.41 parts of calcium zirconium silicate, 7.41 parts of barium zirconium silicate and 7.41 parts of magnesium zirconium silicate were thoroughly mixed with 50 parts of water. Each ingredient had particle sizes averaging 5 microns in size or finer. The mass was then molded into the shape of balls of about ¾" to 1¼" in fired diameter by hand rolling. After drying, the balls were fired at 2300° F. for 40 hours.

In testing these and other balls for abrasion resistance, the following procedure was used: The test balls were milled overnight to remove any surface or skin effect which might be present. They were then thoroughly dried, measured and weighed. Enough of each type of body was used so that there were about an equal number of balls of each body in a charge. The balls added were enough to fill a gallon mill to the half way mark. The weight of the charge of balls varied with the density of the bodies tested. To this charge of balls in a gallon mill was added 2300 grams of zircon sand, 69 grams of clay (to keep the sand fairly well suspended so that it did not cake and prevent abrasion) and 1100 ccs. of water. The mill was run at 77 R. P. M. for 7 hours, and the balls washed and dried thoroughly. The bodies were considered on the basis of the percentage loss in weight, the lower the loss the better the body composition. The time of seven hours was chosen because this treatment caused the regular porcelain balls, which were a very good grade of commercial grinding porcelain, to lose about 1% in weight. As auxiliary standards, flint balls and special porcelain balls were also tested. These special porcelain balls are not commercial but were experimentally made under conditions designed to produce the best possible results known before and are the best synthetic grinding media I have found for use in grinding ceramic materials.

The zircon composition bodies tested were as follows:

1. As prepared according to the example outlined above.
2. As in 1, except that the zircon averaged 20 microns in particle sizes.
3. As in 1, except that the zircon averaged 35–40 microns in particle sizes.
4. As in 1, except that the zircon averaged 60–70 microns in particle sizes.
5. As in 1, except that the ingredients of the raw batch were 64.52 parts of zircon, 16.13 parts of Kentucky ball clay, and 6.45 parts of calcium zirconium silicate, 6.45 parts of barium zirconium silicate, and 6.45 parts of magnesium zirconium silicate.
6. As in 1, except that the ingredients of the raw batch were 50 parts of zircon, 22.73 parts of Kentucky ball clay, and 9.09 parts of calcium zirconium silicate, 9.09 parts of barium zirconium silicate, and 9.09 parts of magnesium zirconium silicate.
7. As in 6, except that the zircon averaged 35–40 microns in particle sizes.

The results are shown in the following table:

*Table*

| | Percent loss in weight |
|---|---|
| Standard porcelain of good grade | 1.00 |
| Special high quality porcelain | 0.50 to .58 |
| Flint | 0.16 to .29 |
| Zircon composition 1 | 0.262 |
| Zircon composition 2 | 0.343 |
| Zircon composition 3 | 0.467 |
| Zircon composition 4 | 0.503 |
| Zircon composition 5 | 0.452 |
| Zircon composition 6 | 0.320 |
| Zircon composition 7 | 0.459 |

In preparing and testing zircon composition balls, high results of 2.00 or higher were obtained when too coarse material or too high a zircon content was used so that the body did not appear homogeneous when closely hand examined.

The zircon composition balls used in the above tests were shaped by hand rolling into as nearly spherical a form as possible. As is well known in ceramics, the abrasion resistance results (loss of weight) could be materially improved if the balls had been made of de-aired mix and machine pressed instead of hand rolled from a regular mix not de-aired.

In addition to the advantages previously enumerated, the zircon composition balls of the present invention are considerably denser than the porcelain and flint balls of the prior art. Because of this, they are capable of doing more work in a shorter period of time. This is shown by the following test: Two mills of identical size (gallon) were used and one was charged to the half way mark with regular porcelain balls, and the other to the same height with zircon composition balls according to the present invention. This is considered the proper charge for best milling practice. The weight of the balls necessary to give this volume was 8 lbs., 6 ozs. of regular porcelain balls and 12 lbs., 5 ozs. of zircon balls. Both sets of balls were carefully selected for uniformity of size so that there would be no variation in this respect. To each mill was added 1100 grams frit, 66 grams zirconium oxide opacifier, 66 grams enamelers' clay, 1.1 grams sodium nitrite, and 440 ccs. water. The mills were run in adjacent sections of the same rack so that both received identical treatment. At intervals of time, as shown in the following table, both mills were stopped and tested for fineness of material being milled by screening 10 ccs. of slip and reporting the grams of dried residue remaining on the screens after thoroughly washing.

*Table*

| Milling time in min. | Commercial porcelain balls | | | Zircon composition balls | | |
|---|---|---|---|---|---|---|
| | 40 mesh | 200 mesh | 325 mesh | 40 mesh | 200 mesh | 325 mesh |
| 45 | 3.4 | 7.8 | N | 1.0 | 7.0 | N |
| 60 | 3.0 | 7.1 | N | 0.0 | 5.7 | N |
| 75 | 1.9 | 6.3 | N | | 4.4 | N |
| 90 | 1.7 | 5.4 | N | | 3.2 | N |
| 100 | 1.1 | 4.7 | N | | 2.5 | N |
| 110 | 0.2 | 4.3 | N | | 1.9 | N |
| 120 | | 3.6 | N | | 1.3 | N |
| 130 | | 3.0 | N | | 0.9 | N |
| 140 | | 2.2 | N | | 0.5 | N |
| 150 | | 1.7 | N | | 0.2 | 2.4 |
| 160 | | 1.1 | N | | | 2.3 |
| 170 | | 0.8 | N | | | 2.2 |
| 180 | | 0.5 | N | | | 2.0 |
| 190 | | 0.5 | 3.3 | | | 1.5 |
| 200 | | 0.4 | 3.1 | | | 1.4 |
| 210 | | 0.3 | 2.9 | | | 1.2 |
| 220 | | 0.2 | 2.5 | | | 1.0 |
| 230 | | 0.2 | 2.3 | | | 0.8 |
| 240 | | 0.1 | 2.0 | | | 0.6 |
| 250 | | 0.1 | 1.7 | | | 0.5 |
| 260 | | 0.1 | 1.5 | | | 0.4 |
| 270 | | | 1.2 | | | 0.3 |
| 280 | | | 1.1 | | | 0.2 |
| 290 | | | 1.1 | | | 0.1 |
| 320 | | | 0.7 | | | |
| 350 | | | 0.5 | | | |
| 380 | | | 0.2 | | | |
| 410 | | | 0.1 | | | |

N=Not tested.

Thus it will be seen that the efficiency of the porcelain balls, apart from resistance to abrasion, is such that it requires 33% more time to mill a given charge to a given fineness with regular porcelain than with zircon composition.

When parts are mentioned in the present specification, parts by weight are understood.

Although this invention has been generally described with respect to balls, other grinding shapes, such as rods, may also be used. Further, the mill itself or the lining thereof may be made of this zircon composition. Many other variations are possible within the scope of the invention, and it is not intended to be limited except as defined by the appended claims.

I claim:

1. As a grinding material, a finely-divided composition containing zirconium silicate, clay, and an auxiliary flux.

2. As a grinding material, a finely-divided composition containing zirconium silicate, clay, calcium zirconium silicate, barium zirconium silicate, and magnesum zirconium silicate.

3. As a grinding material, a finely-divided composition containing 35 to 70 per cent zirconium silicate, a minor proportion of clay, and a minor proportion of an auxiliary flux.

4. As a grinding material, a finely-divided composition containing 45 to 65 per cent zirconium silicate, 12 to 28 per cent clay, and 17 to 35 per cent of an auxiliary flux.

5. As a grinding material, a finely-divided composition containing 45 to 65 per cent zirconium silicate, 12 to 28 per cent clay, and 17 to 35 per cent of an auxiliary flux comprising calcium zirconium silicate, barium zirconium silicate, and magnesium zirconium silicate.

6. As a grinding material, a finely-divided composition containing zirconium silicate, clay, and an auxiliary flux, said composition having average particle sizes less than 70 microns.

7. As a grinding material, a finely-divided composition containing zirconium silicate, clay, calcium zirconium silicate, barium zirconium silicate, and magnesium zirconium silicate, said composition having average particle sizes less than 70 microns.

8. As a grinding material, a finely-divided composition containing 35 to 70 per cent zirconium silicate, a minor proportion of clay, and a minor proportion of an auxiliary flux, said composition having average particle sizes less than 70 microns.

9. As a grinding material, a finely-divided composition containing 45 to 65 per cent zirconium silicate, 12 to 28 per cent clay, and 17 to 35 per cent of an auxiliary flux, said composition having average particle sizes less than 70 microns.

10. As a grinding material, a finely-divided composition containing 45 to 65 per cent zirconium silicate, 12 to 28 per cent clay, and 17 to 35 per cent of an auxiliary flux comprising calcium zirconium silicate, barium zirconium silicate, and magnesium zirconium silicate, said composition having average particle sizes less than 70 microns.

11. As a grinding material, a finely-divided composition containing zirconium silicate, clay, and an auxiliary flux, said composition having average particle sizes less than 20 microns.

12. As a grinding material, a finely-divided composition containing zirconium silicate, clay, calcium zirconium silicate, barium zirconium silicate, and magnesum zirconium silicate, said composition having average particle sizes less than 20 microns.

13. As a grinding material, a finely-divided composition containing 35 to 70 per cent zirconium silicate, a minor proportion of clay, and a minor proportion of an auxiliary flux, said composition having average particle sizes less than 20 microns.

14. As a grinding material, a finely-divided composition containing 45 to 65 per cent zirconium silicate, 12 to 28 per cent clay, and 17 to 35 per cent of an auxiliary flux, said composition having average particle sizes less than 20 microns.

15. As a grinding material, a finely-divided composition containing 45 to 65 per cent zirconium silicate, 12 to 28 per cent clay, and 17 to 35 per cent of an auxiliary flux comprising calcium zirconium silicate, barium zirconium silicate, and magnesium zirconium silicate, said composition having average particle sizes less than 20 microns.

16. As a grinding material, a finely-divided composition containing about 60 per cent zirconium silicate, about 18 per cent clay, and about 22 per cent of a mixture comprising approximately equal proportions of calcium zirconium silicate, barium zirconium silicate, and magnesium zirconium silicate, said composition having average particle sizes of not more than 5 microns.

CHARLES H. COMMONS, Jr.